(12) United States Patent
Miller

(10) Patent No.: US 6,220,967 B1
(45) Date of Patent: Apr. 24, 2001

(54) CONSTANT VELOCITY JOINT VENT PLUG

(75) Inventor: Michael Miller, White Lake Township, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/590,821

(22) Filed: Jun. 9, 2000

(51) Int. Cl.[7] ........................................................ F16D 3/16
(52) U.S. Cl. ........................... 464/145; 464/139; 464/906
(58) Field of Search .................................... 285/42, 43, 44, 285/56; 464/139, 140, 141, 142, 143, 144, 145, 906

(56) References Cited

U.S. PATENT DOCUMENTS

| | | |
|---|---|---|
| 3,488,979 * | 1/1970 | Croset ................................... 464/145 |
| 4,319,467 | 3/1982 | Hegler . |
| 4,893,608 * | 1/1990 | Reaser .................................... 285/42 |
| 5,704,838 * | 1/1998 | Teale ..................................... 464/143 |
| 6,010,409 | 1/2000 | Johnson . |
| 6,042,479 * | 3/2000 | Hopson et al. ....................... 464/145 |

* cited by examiner

Primary Examiner—Lynne H. Browne
Assistant Examiner—Aaron Dunwoody
(74) Attorney, Agent, or Firm—Mick A. Nylander

(57) ABSTRACT

A vent plug for use with a universal joint having an outer race including an vent aperture, the vent plug including an elongate body portion having a first end and a second end, a retention cap disposed adjacent the first end and a vent cavity extending from the first end to the second end, the elongate body having a rigid outer surface receivable within the vent aperture wherein the retention cap includes an escape aperture in communication with the vent cavity allowing the universal joint to vent internal pressure during high speed operation.

7 Claims, 2 Drawing Sheets

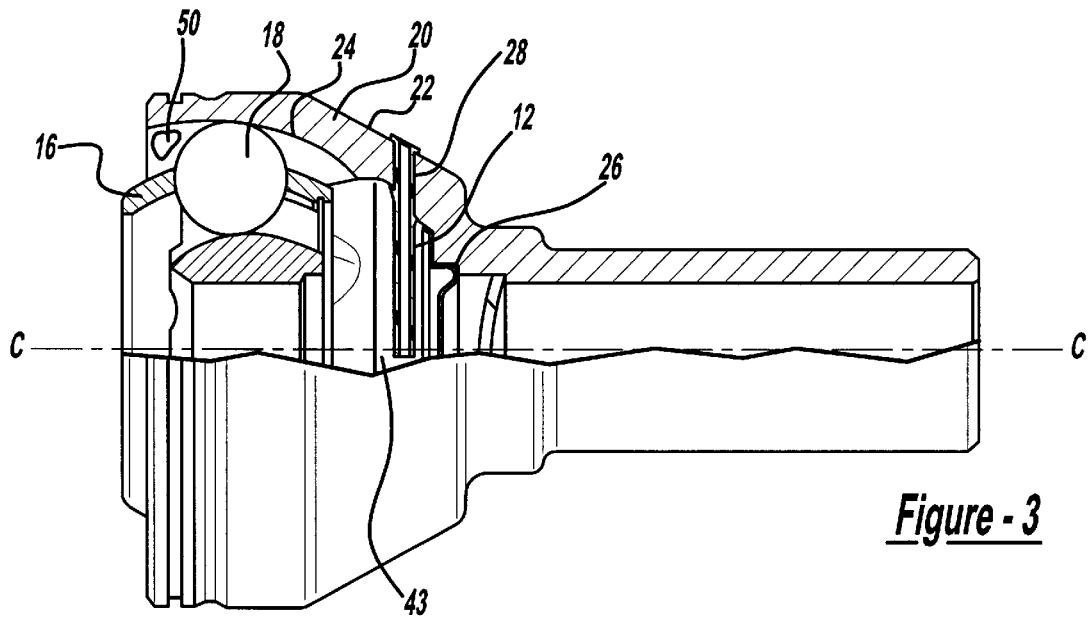
*Figure - 3*
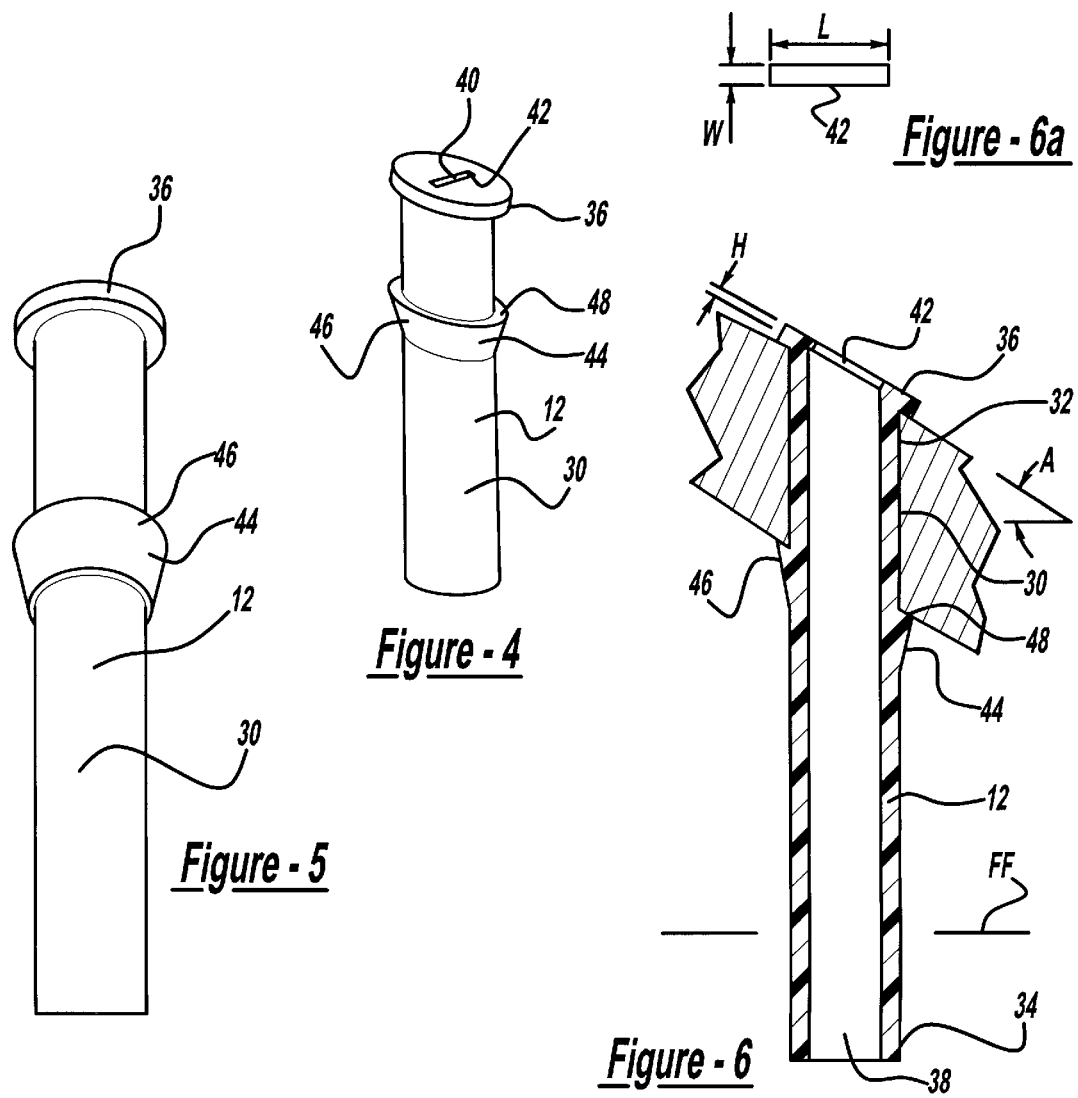
*Figure - 6a*
*Figure - 4*
*Figure - 5*
*Figure - 6*

CONSTANT VELOCITY JOINT VENT PLUG

TECHNICAL FIELD

This invention relates to an improved venting constant velocity universal joint and specifically to a constant velocity joint vent plug.

BACKGROUND ART

Constant velocity universal joints are well known in the art and are employed where transmission of a constant velocity rotary motion is desired or required. The tripod joint is characterized by a bell-shaped outer race (housing) disposed around an inner race.

One common type of constant velocity universal joint is a fixed or Rzeppa style. Fixed constant velocity joints are generally grease lubricated for life and sealed by an elastomeric sealing boot when used on some drive shafts. Most constant velocity universal joints are sealed in order to retain grease inside the joint while keeping contaminants and foreign matter, such as dirt and water, out of the joint. In order to achieve this protection, the constant velocity joint is usually enclosed at the open end of the outer race by a sealing boot made of rubber, thermoplastic or urethane. Such sealing and protection of the constant velocity joint is necessary because, once the inner chamber of the outer joint is partially-filled and thus lubricated, it is generally lubricated for life.

It is often necessary to vent the constant velocity joint in order to minimize air pressure fluctuations due to expansion and contraction of the air within the joint during operation of the joint. Further, in some circumstances the constant velocity joint boot may "blow out" or rupture during high speed operation. Venting is required when using a rubber material for the boot.

U.S. Pat. No. 4,319,467 issued to Hegler et al. discloses a seal vent subassembly press fitted into the collar bore of a universal joint. The subassembly includes a vent disc which is nested in a seal disc to form a venting arrangement to the exterior of the housing by way of various holes and chambers. However, this vent hole may still be subject to grease buildup during a static state or operative state.

U.S. Pat. No. 6,010,409, issued to GKN Automotive, Inc. discloses a vent regulator device adapted for use in a constant velocity joint including a housing having an inner surface defining an inner cavity. The inner surface includes an annular portion, and a domed portion which has a relatively small vent hole centrally located therein. The vent regulator device further includes a member having a first end and a second end where the first end is mounted to the inner surface of the housing and the second end is disposed proximate the vent hole. When the constant velocity joint is in one of either a static state and an active state rotating at speeds below a predetermined threshold, the vent hole is overlappingly covered by the first end of the member, thereby preventing grease from penetrating the hole. Moreover, when the constant velocity joint is in an active state rotating at speeds above the predetermined threshold, centrifugal forces cause the second end of the member to move away radially from the vent hole to allow venting of air therethrough.

Consequently, an improved constant velocity joint design is provided which allows for reliable venting of the joint when large quantities of grease are contained therein. In addition, the design should eliminate grease flow out of the joint and not allow any foreign matter into the joint.

BRIEF SUMMARY OF THE INVENTION

It is an object according to the present invention to provide a system for venting a constant velocity joint without a loss of grease or other internal joint lubricant.

It is still a further object according to the present invention to provide a constant velocity joint which includes a vent plug for effectively venting the joint.

In carrying out the above objects, features and advantages of the present invention, provided is a vent plug for use with a universal joint having an outer race including a vent aperture, the vent plug comprising an elongate body portion having a first end and a second end, a retention cap disposed adjacent the first end and a vent cavity extending from the first end to the second end, the elongate body having a rigid outer surface receivable within the vent aperture, wherein the retention cap includes an escape aperture in communication with the vent cavity allowing the universal joint to vent internal pressure during high speed operation.

It is still a further object according to the present invention to provide a venting constant velocity joint system including a constant velocity joint having an outer race and an inner race, the outer race having an outer wall, an inner wall and a back wall, the inner race defining a vent aperture extending from the outer wall to the inner wall, a vent plug having an elongate body portion including a first end and a second end, a retention cap disposed adjacent the first end and a vent cavity extending from the first end to the second end and located between the back wall and the inner race, the elongate body having a rigid outer surface receivable within the vent aperture wherein the retention cap includes an escape aperture in communication with the cavity allowing the universal joint to vent internal pressure during operation.

It is yet another object of the present invention to provide a venting constant velocity joint system with a vent plug having an elongate body including a retention lip disposed between the first end and the second end of the elongate body for use in retaining the vent plug within the vent aperture.

It is still another object of the present invention to provide a venting constant velocity joint which prevents the entry of outside contaminants.

It is another object of the present invention to provide a venting constant velocity joint system of having a vent plug with an escape aperture defined by a slit having a width in a range from 0.10 millimeters to 0.20 millimeters, a length from 3 millimeters to 5 millimeters and a height from 0.5 millimeters to 1.0 millimeters.

It is another object of the present invention to provide a venting constant velocity joint system of wherein the vent plug is manufactured from thermal plastic elastomer with a durometer hardness in a range from 70 to 120.

It is another object of the present invention to provide a venting constant velocity joint system of wherein vent plug extends downwardly into the constant velocity joint at least to the centerline of the constant velocity joint.

It is still another object of the present invention to provide a venting constant velocity joint system with a vent plug having retention lip with a frustoconical section and an engagement surface whereby the engagement surface contacts the inner wall of the outer race and the retention cap engages the outer wall of the outer race such that the vent plug is retained within the outer race.

In high speed operation a venting of the constant velocity universal joint is useful in relieving internal pressure created by the grease volatility caused by sometimes high internal operating temperatures. In operation, when the constant velocity universal joint is in operation, internal pressure is continually relieved as air passes through the slit 42 to the atmosphere thereby stabilizing pressure between the joint and outside atmosphere.

It is yet another object of the present invention to provide a venting constant velocity joint having an outer race with an inner wall which defines an first angle and said retention lip engagement surface defines a second angle which is substantially equal to said first angle.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 3 is a partial cross-sectional view of the constant velocity joint according to the present invention, taken along line 3—3 of FIG. 2;

FIG. 4 is a perspective view of the vent plug of the present invention;

FIG. 5 is another perspective view of the of the vent plug according to the present invention; and FIG. 6 is a cross-sectional view of the vent plug of the present invention.

FIG. 6A is a diagrammatical depiction of the escape aperture of the present invention.

BEST MODE FOR CARRYING OUT THE INVENTION

Figure 1:
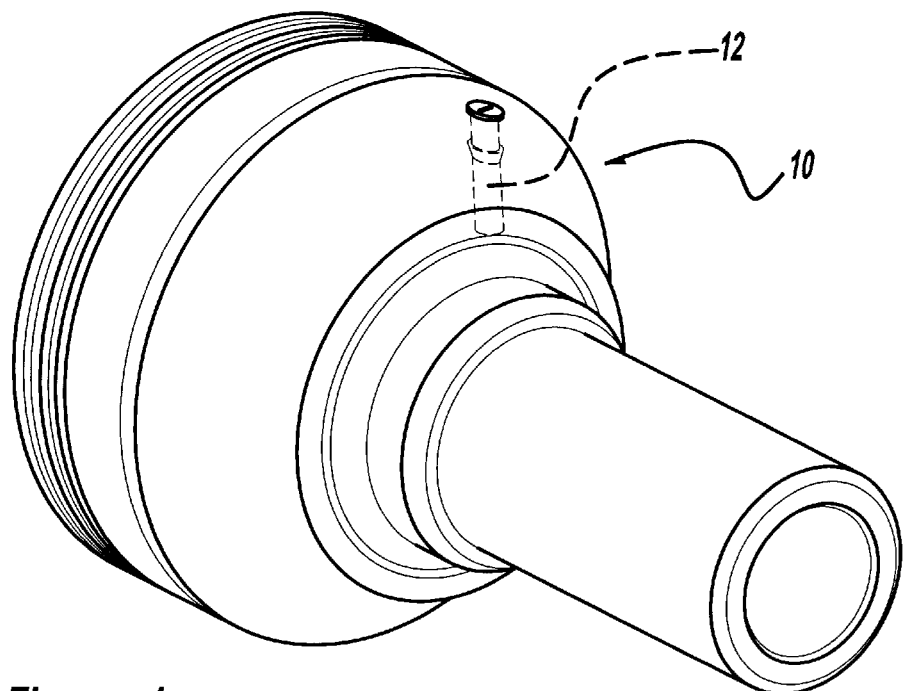
FIG. 1 is a perspective view of a constant velocity joint and vent plug according to the present invention.
Figure 2:
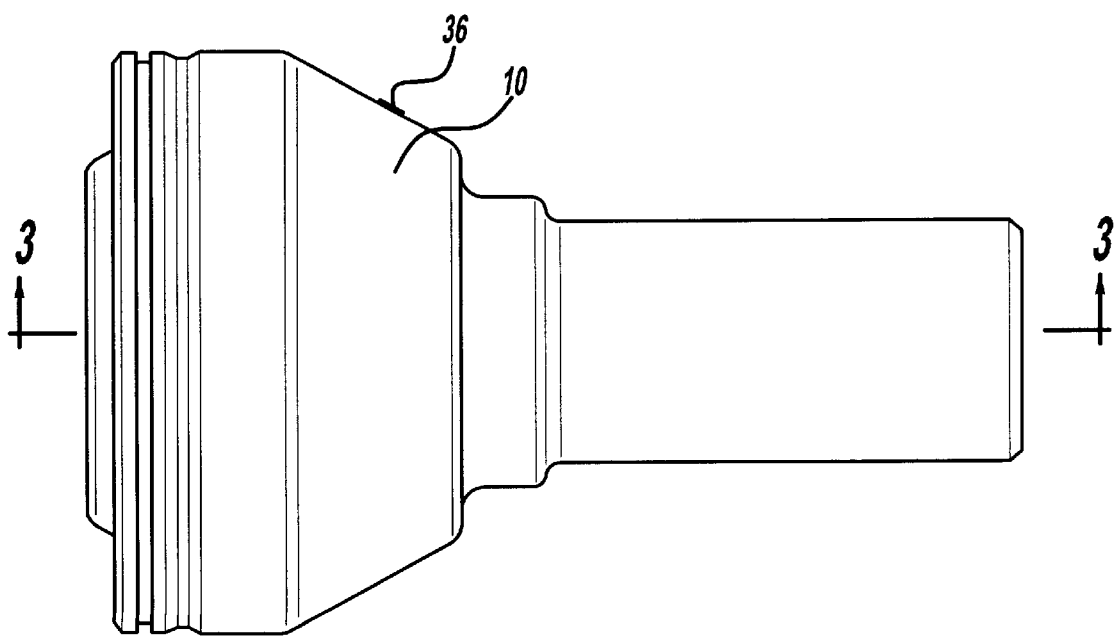
FIG. 2 is a side view of a constant velocity joint according to the present invention.

Referring now to FIGS. 1 and 2, there is shown generally a monoblock type of universal joint and more specifically a constant velocity universal joint 10 of the fixed type or Rzeppa type. Vent plug 12 is shown disposed within constant velocity joint 10 in FIG. 1. As shown in FIG. 3, constant velocity joint 10 comprises an inner race 14, a cage 16, ball 18 and outer race 20. Usually six balls 18 are used with the constant velocity joint 10.

Outer race 20 includes an outer wall 22, inner wall 24 and back wall 26. A vent aperture 28 is shown extending from outer wall 22 to inner wall 24. Vent plug 12 is shown disposed between back wall 26 and inner race 14 within constant velocity universal joint 10. Vent plug 12 extends downwardly into the constant velocity universal joint 10 at least to the centerline C of the constant velocity universal joint. Vent plug.12 includes an elongate body portion 30 having a first end 32 and a second end 34 as shown in FIG. 6. A retention cap 36 is located on first end 32. A vent cavity 38 extends between first end 32 and second end 34.

Retention cap 36 includes an escape aperture 40 which is in communication with the vent cavity 38. Escape aperture may be a slit 42, hole, or opening of any shape suitable for allowing air to escape as discussed further below. Referring to FIGS. 6 and 6A, in the preferred embodiment where the escape aperture is a slit 42, it is preferred to have slit 42 with a width W in a range from 0.10 millimeter to 0.20 millimeter. Slit 42, in the preferred embodiment has a length L in a range from 3 millimeters to 5 millimeters and a height H from 0.5 millimeters to 1.0 millimeters.

Referring to FIG. 3, vent cavity 38 is in communication with the interior 43 of the constant velocity universal joint 10. Vent plug further includes a retention lip 44. Retention lip 44 has an frustoconical section 46 with an angled engagement surface 48. Engagement surface is contacts inner wall 24 of outer race 20 such that the vent plug is adequately retained within the constant velocity universal joint. Inner wall 24 defines a first angle A to the centerline C as shown in FIG. 6. Retention lip engagement surface 48 defines a second angle A' which is substantially identical to first angle A.

In operation, the constant velocity universal joint will reach a certain status where venting of the internal area 43 will relieve pressure created by grease volatility and high internal running temperatures. Pressure inside the constant velocity universal joint 10 will be relived as air escape through the slit 42 into the atmosphere. Stabilization will be continuous as the slit 42 will allow a release of air in direct relation to any increase in internal pressure.

Slit 42, by its design will not allow contaminants such as water or dirt to enter the inside of the constant velocity universal joint 43. Importantly, grease 50, will not be able to escape as it will be able to travel the length of the elongate body 12 nor travel up the cavity 38. The grease, as is known in the art, will tend to migrate by centrifugal forces from the center of the joint to the exterior of the joint. Grease entrance into the cavity 38 will be very difficult as the vent plug extends in top the center of the joint and is positioned above the grease fill line FF of the specified joint.

The vent plug is manufactured from a rigid material such as thermal plastic elastomer or rubber. It will preferably be made from thermal plastic elastomer. The retention lip 44 in combination with the retention cap 36 retains the vent plug within the vent aperture 28. The retention lip 44 further is essential in centering the vent plug within the constant velocity universal joint 10.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A venting constant velocity joint system comprising:
   a constant velocity joint having an outer race and an inner race, said outer race have a outer wall, and inner wall and a back wall;
   said inner race defining a vent aperture extending from said outer wall to said inner wall;
   a vent plug having an elongate body portion including a first end and a second end, a retention cap disposed adjacent said first end and a vent cavity extending from said first end to said second end and located between said back wall and said inner race, said elongate body having a rigid outer surface receivable within said vent aperture wherein said retention cap includes an escape aperture in communication with said cavity allowing the universal joint to vent internal pressure during operation.

2. The venting constant velocity joint system of claim 1 wherein the elongate body further comprises a retention lip disposed between said first end and said second end of said elongate body for use in retaining said vent plug within said vent aperture.

3. The venting constant velocity joint system of claim 1 wherein said escape aperture is a slit having a width in a range from 0.10 millimeters to 0.20 millimeters, a length from 3 millimeters to 5 millimeters and a height from 0.5 millimeters to 1.0 millimeters.

4. The venting constant velocity joint system of claim 1 wherein the vent plug is manufactured from thermal plastic elastomer.

5. The venting constant velocity joint system of claim 1 wherein said vent plug extends downwardly into said constant velocity joint at least to the centerline of the constant velocity joint.

6. The venting constant velocity joint system of claim 2 wherein said retention lip includes a frustoconical section and an engagement surface whereby said engagement surface contacts said inner wall of said outer race and said retention cap engages said outer wall of said outer race such that said vent plug is retained within said outer race.

7. The venting constant velocity joint system of claim 6 wherein said inner wall of said inner race defines an first angle and said retention lip engagement surface defines a second angle which is substantiality the equal to said first angle.

* * * * *